(12) United States Patent
Girond

(10) Patent No.: US 12,445,817 B2
(45) Date of Patent: Oct. 14, 2025

(54) SYSTEM AND METHOD FOR UPLOADING DATA FROM MAIN VEHICLE TO A CLOUD SERVER

(71) Applicant: TOYOTA MOTOR EUROPE, Brussels (BE)

(72) Inventor: Paul Girond, Brussels (BE)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 397 days.

(21) Appl. No.: 17/908,803

(22) PCT Filed: Mar. 5, 2020

(86) PCT No.: PCT/EP2020/055937
§ 371 (c)(1),
(2) Date: Sep. 1, 2022

(87) PCT Pub. No.: WO2021/175435
PCT Pub. Date: Sep. 10, 2021

(65) Prior Publication Data
US 2023/0345217 A1   Oct. 26, 2023

(51) Int. Cl.
H04W 4/44 (2018.01)
H04L 67/62 (2022.01)
H04W 4/02 (2018.01)
H04W 24/10 (2009.01)

(52) U.S. Cl.
CPC ............. *H04W 4/44* (2018.02); *H04L 67/62* (2022.05); *H04W 4/02* (2013.01); *H04W 24/10* (2013.01)

(58) Field of Classification Search
CPC ........ H04L 67/62; H04W 24/10; H04W 4/02; H04W 4/44
See application file for complete search history.

(56) References Cited

U.S. PATENT DOCUMENTS

| | | |
|---|---|---|
| 2013/0151693 A1 | 6/2013 | Baker et al. |
| 2014/0309789 A1* | 10/2014 | Ricci ................... G06Q 20/308 700/276 |
| 2015/0120087 A1 | 4/2015 | Duan et al. |
| 2015/0288636 A1 | 10/2015 | Yalavarty et al. |
| 2018/0359445 A1* | 12/2018 | Liao ....................... H04L 67/306 |
| 2021/0179106 A1* | 6/2021 | Kim .................... B60W 30/162 |
| 2022/0028254 A1* | 1/2022 | Ogawa ............. G08G 1/096716 |

* cited by examiner

Primary Examiner — Timothy X Pham
(74) Attorney, Agent, or Firm — Dinsmore & Shohl LLP

(57) ABSTRACT

The disclosure relates to system for uploading data from a main vehicle to a cloud server, comprising: a first sensor configured to obtain geo localization information of the main vehicle; a second sensor configured to monitor at least one predetermined characteristic of the main vehicle and/or of the environment of the man vehicle; a communication unit configured to transmit a report to an external cloud server and configured to receive network information from the external cloud server via a wireless communications network, said network information comprising at least one locally varying characteristic of the wireless communications network across a geographic region, and an electronic control unit configured to: repeatedly generate reports by collecting the at least one monitored characteristic and transmit them in predetermined time intervals via the communication unit, modify the predetermined time intervals as a function of the received network information and the obtained geo localization information.

13 Claims, 1 Drawing Sheet

SYSTEM AND METHOD FOR UPLOADING DATA FROM MAIN VEHICLE TO A CLOUD SERVER

CROSS-REFERENCE TO RELATED APPLICATIONS

This application is a National Stage of International Application PCT/EP2020/055937 filed on Mar. 5, 2020, the entire contents of which are hereby incorporated by reference.

FIELD OF THE DISCLOSURE

The present disclosure is related to the field of mobile communication, in particular to a system and method for uploading data from main vehicle to a cloud server.

BACKGROUND OF THE DISCLOSURE

Recently, it has become popular to use vehicle as probes to take measurements/collect data of their environment, e.g. of the current traffic situation, or of free parking slots. In this context it is desirable that the vehicles are equipped with a mobile communication system, e.g. a so-called telematics unit, for transmission of sampled data from the vehicle to a centralized server, i.e. a cloud server. Based on said collected data a map of the environment in which data have been collected may be established.

Furthermore the vehicle may log vehicle data which may be regularly reported to the cloud server for monitoring the vehicle state, e.g. in order to predict necessary maintenance services of the vehicle.

For example, modern vehicles are increasingly equipped with sensors and/or cameras and other optical sensors which are configured to acquire information of the vehicle and/or of the surrounding of the vehicle, e.g. data concerning the traffic situation around the vehicle.

It is further known to equip a vehicle with a geo localization sensor, e.g., a GPS sensor. In this way the collected data can be assigned with the current geo localizations before being transmitted to the cloud server.

However, the validity of the collected data can be time dependent (e.g. an empty parking slot information). For this reason, there types of data (e.g. parking slot information) which require a quasi-real-time transmission or at least a timely transmission of the data. To ensure this data validity, mechanisms are put in place to plan the data sending at the best time (e.g. on periodic basis, after a specific event). However, those mechanisms rely on a stable communication. The signal quality of the mobile network used to transmit the data can though spatially and temporally change.

US2015288636A1 relates to a method and apparatus for performing data exchange via vehicle telematics. Vehicle telematics may be utilized to allow a user of a vehicle to interact with services available over a communications network. These services may include turn-by-turn directions, telephone communications, vehicle monitoring, and roadside assistance. In some cases, the telematics services may be provided by the vehicle or telematics unit manufacturer, while in other cases, the services may be provided by a third party telematics service provider. To allow these services to operate, a vehicle may communicate over the network and the services using a communications protocol known to both the vehicles and the services.

SUMMARY OF THE DISCLOSURE

Currently, it remains desirable to provide a system and a method for uploading data from main vehicle to a cloud server in a reliable manner. In particular, it remains desirable to anticipate a potential loss of communication between the vehicle and the cloud server.

Therefore, according to the embodiments of the present disclosure, a system for uploading data from a main vehicle to a cloud server, comprising:
  a first sensor configured to obtain geo localization information of the main vehicle;
  a second sensor configured to monitor at least one predetermined characteristic of the main vehicle and/or of the environment of the man vehicle;
  a communication unit configured to transmit a report to an external cloud server and configured to receive network information from the external cloud server via a wireless communications network, said network information comprising at least one locally varying characteristic of the wireless communications network across a geographic region; and
  an electronic control unit configured to:
    repeatedly generate reports by collecting (and desirably buffering) the at least one monitored characteristic and transmit them in predetermined time intervals via the communication unit; and
    modify the predetermined time intervals as a function of the received network information and the obtained geo localization information.

By providing such a system, it becomes possible to foresee the loss of communication between the communication unit and the cloud server e.g. by using Map/Cloud information and pull-forward the report sending to the cloud server.

Accordingly, by foreseeing the loss of communication (e.g. from map or cloud info), the report sending can be pull-forwarded.

Furthermore, by preventing any delay, it can be ensured that the data is (timely) valid and is useful for the cloud services.

For example, the system may store map information which can indicate predefined communication perturbation events, as e.g. a tunnel, bridge, tollgate, etc. Furthermore, it may store map information of the signal strength of the wireless communications network (i.e. mobile communications network) by having other vehicles continuously reporting the current communication signal quality to the cloud. The cloud server may then be able to establish a map of 'low signal quality' areas and inform ego-vehicle when approaching those.

The electronic control unit may further be configured to predict the reliability of the wireless communications network in an anticipated traveling direction of the main vehicle as a function of the received network information and the obtained geo localization information, and to modify the predetermined time intervals as a function of the predicted reliability.

The electronic control unit may further be configured to shorten a current time interval until the next report is to be transmitted, in case the predicted reliability of the wireless communications network in an anticipated traveling direction is below a predetermined reliability threshold.

The electronic control unit may further be configured to modify the predetermined time intervals, in case the received network information fulfills at least one of the following conditions:

the at least one locally varying characteristic indicates a signal quality and/or a signal strength below a respective predetermined threshold, and the at least one locally varying characteristic indicates a reduced signal quality and/or a signal strength at a distance from the main vehicle below a predetermined distance threshold.

The system may further comprise a data storage for storing street map data, wherein the electronic control unit is configured to anticipate the traveling direction of the main vehicle based on the street map data.

The electronic control unit may further be configured to segment the anticipated traveling route of the main vehicle into a plurality of route segments, wherein the predetermined time intervals are defined such that at the end of each route segment a report is transmitted.

The length of a route segment, in particular of the current route segment, may be changed as a function of the predicted reliability of the wireless communications network.

The at least one predetermined characteristic of the main vehicle may comprise log data of vehicle operation.

The at least one predetermined characteristic of the main vehicle may comprise log data of vehicle operation. For example, these log data may comprise data collected by sensors, and/or actuator data, and/or diagnostic data. These data may be continuously received by the communication unit which samples the data.

The first sensor, the second sensor and the communication unit may be installed in or on the main vehicle.

The electronic control unit may be installed in the main vehicle or is external to the main vehicle, in particular comprised by the external cloud server.

The main vehicle and/or another vehicle may be configured to repeatedly measure and report the at least one locally varying characteristic of the wireless communications network to the cloud server during traveling.

The present disclosure further relates to a vehicle comprising the system as described above.

The present disclosure further relates to a method for uploading data from main vehicle to a cloud server, the method comprising:

obtaining geo localization information of the main vehicle;

monitoring at least one predetermined characteristic of the main vehicle and/or of the environment of the man vehicle;

transmitting a report to an external cloud server and receiving network information from the external cloud server via a wireless communications network, said network information comprising at least one locally varying characteristic of the wireless communications network across a geographic region, repeatedly generating reports by collecting the at least one monitored characteristic and transmitting them in predetermined time intervals via the communication unit, and modifying the predetermined time intervals as a function of the received network information and the obtained geo localization information.

The method may have further features and/or steps which correspond to the features and/or functions of the system as described above.

The present disclosure may further relate to a computer program including instructions for executing the steps of the method described above, when said program is executed by a computer.

Finally, the present disclosure may relate to a recording medium readable by a computer and having recorded thereon a computer program including instructions for executing the steps of the method described above, when said program is executed by a computer.

It is intended that combinations of the above-described elements and those within the specification may be made, except where otherwise contradictory.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, and serve to explain the principles thereof.

DESCRIPTION OF THE EMBODIMENTS

Reference will now be made in detail to exemplary embodiments of the disclosure, examples of which are illustrated in the accompanying drawings. Wherever possible, the same reference numbers will be used throughout the drawings to refer to the same or like parts.

Figure 1:
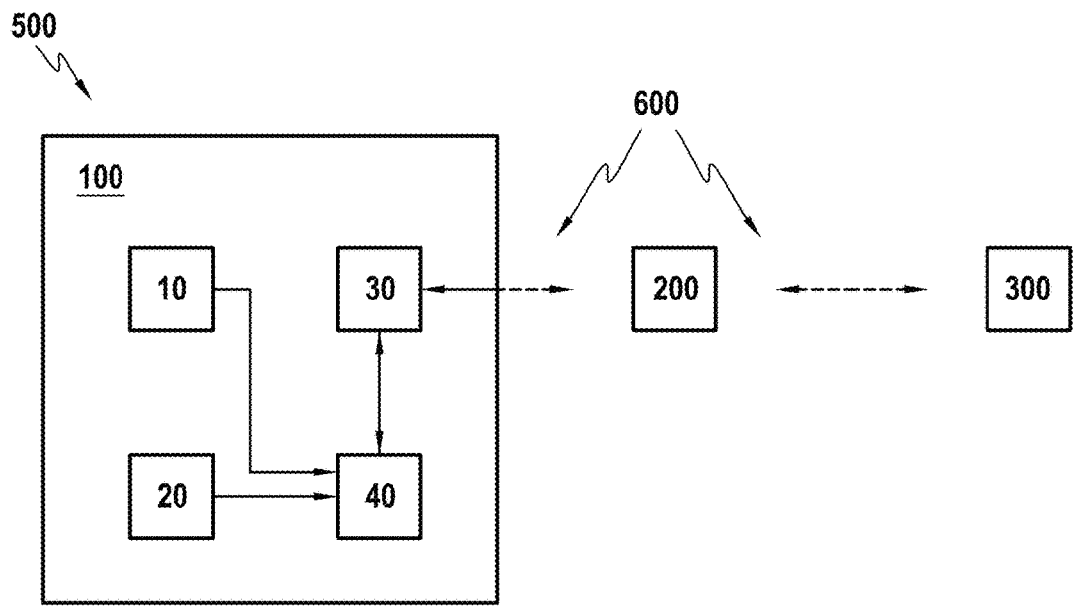
FIG. 1 shows a block diagram of a system according to embodiments of the present disclosure.

FIG. 1 shows a block diagram of a system 500 according to embodiments of the present disclosure. The system is configured to carry out the method according the present disclosure. In particular, the system may be configured to carry out computer instructions, i.e. for uploading data from a main vehicle 100 to a cloud server 200. The system 500 may comprise the cloud server 200 and/or vehicles 100, 300, etc. Alternatively the system 500 may consist of the vehicle 100. The vehicle 100 may be a robotic system or the vehicle 100 may be an at least partially self-driving vehicle.

The system 500 comprises a first sensor 10 configured to obtain geo localization information (e.g. GPS) of the main vehicle 100. Said first sensor is desirably installed in the vehicle 100 but it may though also be external to the vehicle 100.

The system 500 further comprises a second sensor 20 configured to monitor at least one predetermined characteristic of the main vehicle and/or of the environment of the man vehicle. Said second sensor is desirably installed in the vehicle 100 but it may though also be external to the vehicle 100.

The second sensor may be e.g. one or several cameras. For example, the system may comprise a plurality of cameras which together obtain a panoramic (e.g. 360°) image of the vehicle environment. The second sensor may also be configured to measure the signal strength and/or signal quality of the wireless communications network at the current geographic position and time of the vehicle.

The at least one predetermined characteristic of the main vehicle may also comprise log data of vehicle operation. For example, these log data may comprise data collected by sensors, and/or actuator data, and/or diagnostic data. These data may be continuously received by the communication unit which samples the data.

The system 500 further comprises a communication unit 30 (e.g. a telematics unit) configured to transmit a report to an external cloud server 200 and configured to receive network information from the external cloud server via a wireless communications network 600. Said network information comprises at least one locally varying characteristic of the wireless communications network across a geographic region. Said communication unit 30 is desirably installed in the vehicle 100 but it may though also be external to the vehicle 100.

The system 500 further comprises an electronic control unit 40 configured to repeatedly generate reports by collecting (and buffering) the at least one monitored characteristic and transmit them in predetermined time intervals via the communication unit 30, and to modify the predetermined time intervals as a function of the received network information and the obtained geo localization information. Said electronic control unit 40 may be installed in the vehicle 100 but it may though also be external to the vehicle 100, e.g. a part of the cloud server 200.

For example the electronic control unit 40 may comprise a processor (e.g. at least one CPU) and a memory for storing instructions. The memory may be a non-volatile memory and it may comprise said instructions (or a computer program), e.g. of the method according the present disclosure, which can be executed by the processor for uploading data from the main vehicle to the cloud server in an individualized and anticipating way. It may further store map data, which can be used to determine the geo localization determined by the first sensor on a map.

The cloud server 200 may be furthermore in wireless connection with other vehicles 300, which are desirably configured like vehicle 100. The further vehicles 300 may also communicate over the same network 600 with the cloud server 200.

Figure 2:
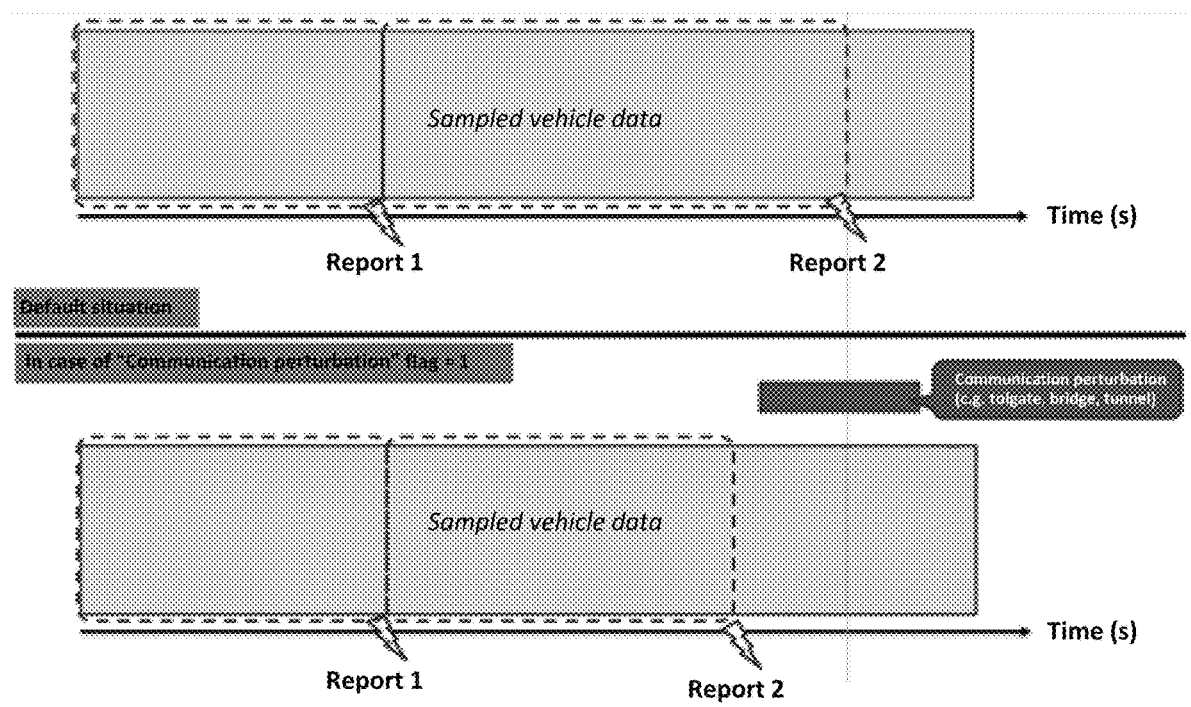
FIG. 2 shows an exemplary scenario according to embodiments of the present disclosure in comparison to a default scenario.

FIG. 2 shows an exemplary scenario according to embodiments of the present disclosure in comparison to a default scenario.

In the default scenario (shown on top in FIG. 2) the electronic control unit 40 regularly and repeatedly generates reports by collecting the at least one monitored characteristic and transmit them in predetermined and fixed time intervals via the communication unit 30. Since the time intervals are fixed, it may occur that the report is to be sent at a time point and/or location where the communications network does not allow a desired transmission of the report, e.g. due to bad signal strength in a tunnel. Accordingly, said report may be received too late by the cloud server, what can be disadvantage, in case the information contained by the report is used by the cloud server for any time critical service, as e.g. providing traffic information.

In contrast, in the exemplary scenario according to embodiments of the present disclosure (shown on bottom of FIG. 2), the electronic control unit 40 anticipates a potential loss of communication between the communication unit 30 and the cloud server using Map or Cloud information. In such a case the electronic control unit 40 sets an internal value, e.g. a "communication perturbation" flag to 1. Accordingly, electronic control unit 40 pull-forwards the time of report transmission, i.e. it sends the report earlier, desirably before the critical area where communication perturbation may occur, is reached by the vehicle. Exemplary scenarios comprise when the vehicle approaches a critical area, e.g. a tunnel, a bridge, a tollgate etc. where the signal quality and/or strength risks to be deteriorated.

For this purpose the control unit may cut the intended travel route into segments, wherein at the end of each segment a report is sent. When it is determined that an end of a segment is within a critical area, where the signal quality and/or strength risks to be deteriorated, the end of said segment is pulled forward, such the sending the respective report happens outside the critical are.

In other words, the current time interval until a next report is to be transmitted may be shortened, in case the predicted reliability of the wireless communications network in an anticipated traveling direction is below a predetermined reliability threshold.

In particular, the predetermined time intervals are modified, in case the locally varying signal quality and/or a signal strength of the wireless network is below a respective predetermined threshold in an anticipated traveling direction The system 500 may anticipate the traveling direction of the main vehicle based on stored street map data, which may indicate areas where the signal quality and/or strength risks to be deteriorated ("communication perturbation" flag is set to 1). Said information may be use, as described above, i.e. to eventually pull forward report transmission.

Additionally or alternatively, the information received from the cloud server may be used. Accordingly, the main vehicle and/or another vehicle may repeatedly measure and report the at least one locally varying characteristic of the wireless communications network to the cloud server during traveling. The cloud server may hence establish and keep updated a geographic map in the at least one locally varying characteristic, in particular those areas where the signal quality and/or strength risks to be deteriorated ("communication perturbation" flag is set to 1). Said information may be shared with the vehicle(s) which may use it, as described above, i.e. to eventually pull forward report transmission.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

The invention claimed is:

1. A system for uploading data from a main vehicle to a cloud server, comprising:
   a first sensor configured to obtain geo localization information of the main vehicle;
   a second sensor to monitor at least one predetermined characteristic of an environment of the main vehicle;
   a communication unit configured to transmit a report to an external cloud server and configured to receive network information from the external cloud server via a wireless communications network, said network information comprising at least one locally varying characteristic of the wireless communications network across a geographic region, and an electronic control unit configured to:
repeatedly generate reports by collecting the at least one monitored characteristic and transmit them in predetermined time intervals via the communication unit, and
modify the predetermined time intervals as a function of the received network information and the obtained geo localization information when the at least one locally varying characteristic indicates a reduced signal quality and a signal strength at a distance from the main vehicle below a predetermined distance threshold.

2. The system according to claim 1, wherein the electronic control unit is configured to:
predict a reliability of the wireless communications network in an anticipated traveling direction of the main vehicle as a function of the received network information and the obtained geo localization information, and
modify the predetermined time intervals as a function of the predicted reliability.

3. The system according to claim 1, wherein the electronic control unit is configured to shorten a current time interval until a next report is to be transmitted, in case the predicted reliability of the wireless communications network in an anticipated traveling direction is below a predetermined reliability threshold.

4. The system according to claim 1, further comprising a data storage for storing street map data, wherein the electronic control unit is configured to anticipate a traveling direction of the main vehicle based on the street map data.

5. The system according to claim 1, wherein the electronic control unit is configured to segment an anticipated traveling route of the main vehicle into a plurality of route segments, wherein the predetermined time intervals are defined such that at the end of each route segment a report is transmitted.

6. The system according to claim 5, wherein a length of a route segment, in particular of a current route segment is changed as a function of the predicted reliability of the wireless communications network.

7. The system according to claim 1, wherein the first sensor, the second sensor and the communication unit are installed in or on the main vehicle.

8. The system according to claim 1, wherein at least one of the main vehicle or another vehicle is configured to repeatedly measure and report the at least one locally varying characteristic of the wireless communications network to the cloud server during traveling.

9. The system according to claim 1, wherein the electronic control unit is installed in the main vehicle.

10. The system according to claim 1, wherein the electronic control unit is external to the main vehicle.

11. The system according to claim 10, wherein the electronic control unit is comprised by the external cloud server.

12. A method for uploading data from a main vehicle to a cloud server, the method comprising:
obtaining geo localization information of the main vehicle;
monitoring at least one predetermined characteristic of the environment of the main vehicle;
transmitting a report to an external cloud server and receiving network information from the external cloud server via a wireless communications network, said network information comprising at least one locally varying characteristic of the wireless communications network across a geographic region,
repeatedly generating reports by collecting the at least one monitored characteristic and transmitting them in predetermined time intervals via the communication unit, and
modifying the predetermined time intervals as a function of the received network information and the obtained geo localization information when the at least one locally varying characteristic indicates a reduced signal quality and a signal strength at a distance from the main vehicle below a predetermined distance threshold.

13. A vehicle comprising a system for uploading data from the vehicle to a cloud server, the system comprising:
a first sensor configured to obtain geo localization information of the vehicle;
a second sensor configured to monitor at least one predetermined characteristic of the environment of the vehicle;
a communication unit configured to transmit a report to an external cloud server and configured to receive network information from the external cloud server via a wireless communications network, said network information comprising at least one locally varying characteristic of the wireless communications network across a geographic region, and
an electronic control unit configured to:
repeatedly generate reports by collecting the at least one monitored characteristic and transmit them in predetermined time intervals via the communication unit, and
modify the predetermined time intervals as a function of the received network information and the obtained geo localization information when the at least one locally varying characteristic indicates a reduced signal quality and a signal strength at a distance from the main vehicle below a predetermined distance threshold.

* * * * *